(12) United States Patent
Karczewicz et al.

(10) Patent No.: US 8,483,282 B2
(45) Date of Patent: Jul. 9, 2013

(54) ENTROPY CODING OF INTERLEAVED SUB-BLOCKS OF A VIDEO BLOCK

(75) Inventors: Marta Karczewicz, San Diego, CA (US); Yan Ye, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 1070 days.

(21) Appl. No.: 12/247,788

(22) Filed: Oct. 8, 2008

(65) Prior Publication Data

US 2009/0097568 A1 Apr. 16, 2009

Related U.S. Application Data

(60) Provisional application No. 60/979,739, filed on Oct. 12, 2007.

(51) Int. Cl.
*H04N 7/26* (2006.01)

(52) U.S. Cl.
USPC .................................................. 375/240.23

(58) Field of Classification Search
USPC .................................................. 375/240.23
See application file for complete search history.

(56) References Cited

U.S. PATENT DOCUMENTS

| 5,740,283 | A | 4/1998 | Meeker |
| 5,748,244 | A | 5/1998 | Jung |
| 2004/0066974 | A1* | 4/2004 | Karczewicz et al. ......... 382/239 |
| 2005/0169374 | A1* | 8/2005 | Marpe et al. ............. 375/240.16 |
| 2006/0078049 | A1 | 4/2006 | Bao et al. |
| 2007/0016418 | A1* | 1/2007 | Mehrotra et al. ............ 704/240 |
| 2007/0053438 | A1* | 3/2007 | Boyce et al. ............. 375/240.24 |
| 2008/0144721 | A1* | 6/2008 | Suzuki et al. ............ 375/240.24 |
| 2008/0260041 | A1* | 10/2008 | Au et al. .................. 375/240.24 |
| 2009/0016626 | A1* | 1/2009 | Zhang et al. .................. 382/238 |
| 2010/0046626 | A1* | 2/2010 | Tu et al. .................... 375/240.18 |
| 2010/0208792 | A1* | 8/2010 | Wiegand ................... 375/240.01 |
| 2011/0097005 | A1* | 4/2011 | Adachi et al. ................. 382/233 |
| 2011/0200114 | A1* | 8/2011 | Schwartz ................. 375/240.18 |

FOREIGN PATENT DOCUMENTS

| CN | 1139352 A | 1/1997 |
| CN | 1689026 A | 10/2005 |
| CN | 101032172 A | 9/2007 |
| JP | 8280021 A | 10/1996 |
| JP | 2001215937 A | 8/2001 |
| JP | 2006501740 A | 1/2006 |
| WO | 2004032032 A1 | 4/2004 |

OTHER PUBLICATIONS

Chen et al., "Introduction to H.264 Advanced Video Coding", 2006, IEEE, pp. 736-741.*

(Continued)

*Primary Examiner* — Matthew Smithers
(74) *Attorney, Agent, or Firm* — Todd E. Marlette

(57) ABSTRACT

This disclosure describes techniques for entropy coding of video blocks, and proposes a syntax element that may promote coding efficiency. The syntax element may identify a number of non-zero value sub-blocks within a video block, wherein the non-zero value sub-blocks comprise sub-blocks within the video block that include at least one non-zero coefficient. A method of coding a video block may comprise coding the syntax element, generating the non-zero value sub-blocks of the video block, and entropy coding the non-zero value sub-blocks.

30 Claims, 12 Drawing Sheets

OTHER PUBLICATIONS

International Search Report & Written Opinion—PCT/US2008/079649, International Search Authority—European Patent Office—Apr. 3, 2009.

Min-Chi Tsai et al: "High Performance Context Adaptive Variable Length Coding Encoder for MPEG-4 AVC/H.264 Video Coding" Circuits and Systems, 2006. APCCAS 2006. IEEE Asia Pacific Conference on, IEEE, Piscataway, NJ, USA, Dec. 1, 2006, pp. 586-589, XP031070903 ISBN: 978-1-4244-0387-5 the whole document.

Ye and M Karczewicz (QUALCOMM) Y: "Improved intra coding" 33. VCEG Meeting; 82. MPEG Meeting; Oct. 20, 2007-Oct. 20, 2007; Shenzhen; (Video Coding Experts Group of ITU-T SG.16),, Oct. 20, 2007, XP030003615 paragraph [3. VLC coding improvement].

Zheng W et al: "Wavelet Coding of Image Using Quadtree Representation and Block Entropy Coding" 1997 IEEE International Conference on Acoustics, Speech, and Signal Processing. Speech Processing. Munich, Apr. 21-24, 1997; [IEEE International Conference on Acoustics, Speech, and Signal Processing (ICASSP)], Los Alamitos.

IEEE Comp. Soc. Press Apr. 21, 1997, pp. 2709-2712, XP000788003 ISBN: 978-0-8186-7920-9 the whole document.

ITU-T H.264, Series H: Audiovisual and Multimedia Systems Infrastructure of audiovisual services—Coding of moving video, "Advanced video coding for generic audiovisual services," Nov. 2007: 7.3.5.3 Residual Data Syntax; and 9.2 CAVLC parsing process for transform coefficient levels.

Taiwan Search Report—TW097139233—TIPO—Mar. 26, 2012.

\* cited by examiner (1, 5, 9, 13, 17, 21, 25, 29, 33, 37, 41, 45, 49, 53, 57, 61)
INTERLEAVED SUB-BLOCK 1

(2, 6, 10, 14, 18, 22, 26, 30, 34, 38, 42, 46, 50, 54, 58, 62)
INTERLEAVED SUB-BLOCK 2

(3, 7, 11, 15, 19, 23, 27, 31, 35, 39, 43, 47, 51, 55, 59, 63)
INTERLEAVED SUB-BLOCK 3

(4, 8, 12, 16, 20, 24, 28, 32, 36, 40, 44, 48, 52, 57, 60, 64)
INTERLEAVED SUB-BLOCK 4

FIG. 4

SYNTAX(NUMBER OF BLOCKS) = 4

(1, 5, 9, 13, 17, 21, 25, 29, 33, 37, 41, 45, 49, 53, 57, 61)
INTERLEAVED SUB-BLOCK 1

(2, 6, 10, 14, 18, 22, 26, 30, 34, 38, 42, 46, 50, 54, 58, 62)
INTERLEAVED SUB-BLOCK 2

(3, 7, 11, 15, 19, 23, 27, 31, 35, 39, 43, 47, 51, 55, 59, 63)
INTERLEAVED SUB-BLOCK 3

(4, 8, 12, 16, 20, 24, 28, 32, 36, 40, 44, 48, 52, 57, 60, 64)
INTERLEAVED SUB-BLOCK 4

FIG. 6

SYNTAX(NUMBER OF BLOCKS) = 3

(1, 4, 7, 10, 13, 16, 19, 22, 25, 28, 31, 34, 37, 40, 43, 46)
INTERLEAVED SUB-BLOCK 1

(2, 5, 8, 11, 14, 17, 20, 23, 26, 29, 32, 35, 38, 41, 44, 47)
INTERLEAVED SUB-BLOCK 2

(3, 6, 9, 12, 15, 18, 21, 24, 27, 30, 33, 36, 39, 42, 45, 48)
INTERLEAVED SUB-BLOCK 2

(49, 50, 51, 52, 53, 54, 55, 56, 57, 58, 59, 60, 61, 62, 63, 64)
SUB-BLOCK 4 – NOT CODED – All VALUES ARE ZERO

FIG. 7

SYNTAX(NUMBER OF BLOCKS) = 2

(1, 3, 5, 7, 9, 11, 13, 15, 17, 19, 21, 23, 25, 27, 29, 31)
INTERLEAVED SUB-BLOCK 1

(2, 4, 6, 8, 10, 12, 14, 16, 18, 20, 22, 24, 26, 28, 30, 32)
INTERLEAVED SUB-BLOCK 2

(33, 34, 35, 36, 37, 38, 39, 40, 41, 42, 43, 44, 45, 46, 47, 48)
SUB-BLOCK 3 – NOT CODED – All VALUES ARE ZERO (49, 50, 51, 52, 53, 54, 55, 56, 57, 58, 59, 60, 61, 62, 63, 64)
SUB-BLOCK 4 – NOT CODED – All VALUES ARE ZERO

FIG. 8

SYNTAX(NUMBER OF BLOCKS) = 1

(1, 2, 3, 4, 5, 6, 7, 8, 9, 10, 11, 12, 13, 14, 15, 16)
SUB-BLOCK 1

(17, 18, 19, 20, 21, 22, 23, 24, 25, 26, 27, 28, 29, 30, 31, 32)
SUB-BLOCK 2 – NOT CODED – All VALUES ARE ZERO (33, 34, 35, 36, 37, 38, 39, 40, 41, 42, 43, 44, 45, 46, 47, 48)
SUB -BLOCK 3 – NOT CODED – All VALUES ARE ZERO (49, 50, 51, 52, 53, 54, 55, 56, 57, 58, 59, 60, 61, 62, 63, 64)
SUB-BLOCK 4 – NOT CODED – All VALUES ARE ZERO

FIG. 9

ENTROPY CODING OF INTERLEAVED SUB-BLOCKS OF A VIDEO BLOCK

This application claims the benefit of U.S. Provisional Application No. 60/979,739, filed on Oct. 12, 2007, the entire content of which is incorporated herein by reference.

TECHNICAL FIELD

This disclosure relates to digital video coding and, more particularly, entropy coding of coefficients of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression generally includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to generate the prediction videos block from the reference frames. After motion compensation, a given residual video block is formed by subtracting the prediction video block from the original video block to be coded.

The video encoder may apply transform, quantization and entropy coding processes to further reduce the bit rate associated with communication of the residual block. Transform techniques may comprise discrete cosine transforms or a conceptually similar process, wavelet transforms, or possibly other types of transforms. In discrete cosine transforms or conceptually similar processes, the transform process changes a set of pixel values into transform coefficients, which represent the energy of the pixel values in the frequency domain. Quantization is applied to the transform coefficients, and generally involves a process that limits the number of bits associated with any given coefficient. Entropy coding comprises one or more processes that collectively compress a sequence of quantized transform coefficients. Examples of entropy coding processes include content adaptive variable length coding (CAVLC) and context adaptive binary arithmetic coding (CABAC).

CAVLC is one type of entropy coding technique supported by the ITU H.264/MPEG4, AVC standard. CAVLC uses variable length coding (VLC) tables in a manner that effectively compresses serialized "runs" of transform coefficients. CABAC is another type of entropy coding technique supported by the ITU H.264/MPEG4, AVC standard. CABAC may involve several stages, including binarization, context model selection, and binary arithmetic coding. Many other types of entropy coding techniques also exist, and new entropy coding techniques will likely emerge in the future.

Regardless of the type of entropy coding used in the encoding process, a video decoder may perform inverse entropy coding operations to reconstruct the coefficients. The video decoder then inverse quantizes and inverse transforms the coefficients. The video decoder may decode the video information based on the motion information and residual information associated with video blocks in order to generate a decoded sequence of video information.

SUMMARY

In general, this disclosure describes techniques for entropy coding of video blocks. This disclosure proposes a syntax element that can promote entropy coding efficiency. The syntax element may identify a number of non-zero value sub-blocks within a given video block, wherein the non-zero value sub-blocks comprise sub-blocks within the given video block that include at least one non-zero coefficients (e.g., non-zero transform coefficients). In contrast, zero-value sub-blocks refer to sub-blocks within the given video block that include only zero valued coefficients. According to this disclosure, zero-value sub-blocks may be skipped during entropy encoding, and these zero-value sub-blocks can be reconstructed at the decoder based on the syntax element. In this way, the coding of zero valued coefficients may be avoided to promote coding efficiency. The proposed syntax element provides a mechanism to convey the fact that one or more sub-blocks are zero-value sub-blocks that were skipped during the encoding process, thereby allowing a decoder to reconstruct such zero-value sub-blocks without any additional transfer of information.

In one example, this disclosure provides a method of coding a video block, the method comprising coding a syntax element that defines a number of non-zero value sub-blocks of the video block, wherein the non-zero value sub-blocks include at least one non-zero coefficient, generating the non-zero value sub-blocks of the video block, and entropy coding the non-zero value sub-blocks.

In another example, this disclosure provides an apparatus comprising an entropy coding unit configured to code a syntax element that defines a number of non-zero value sub-blocks of a video block, wherein the non-zero value sub-blocks include at least one non-zero coefficient, generate the non-zero value sub-blocks of the video block, and entropy code the non-zero value sub-blocks.

In another example, this disclosure provides a device comprising means for coding a syntax element that defines a number of non-zero value sub-blocks of a video block, wherein the non-zero value sub-blocks include at least one non-zero coefficient, means for generating the non-zero value sub-blocks of the video block, and means for entropy coding the non-zero value sub-blocks.

In another example, this disclosure provides a device comprising an entropy encoding unit and a wireless transmitter. The entropy encoding unit is configured to encode a syntax element that defines a number of non-zero value sub-blocks of a video block, wherein the non-zero value sub-blocks include at least one non-zero coefficient, generate the non-zero value sub-blocks of the video block, and entropy encode the non-zero value sub-blocks. The wireless transmitter sends a bitstream comprising the entropy coded the non-zero value sub-blocks and the syntax element.

In another example, this disclosure provides a device comprising a wireless receiver that receives a bitstream comprising entropy coded non-zero value sub-blocks and a syntax element, and an entropy decoding unit configured to decode the syntax element to determine a number of non-zero value sub-blocks of a video block, wherein the non-zero value sub-blocks include at least one non-zero coefficient. The entropy decoding unit generates the non-zero value sub-blocks of the video block based on the syntax element, and entropy decodes the non-zero value sub-blocks.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code a video block, wherein the instructions cause the device to code a syntax element that defines a number of non-zero value sub-blocks of the video block, wherein the non-zero value sub-blocks include at least one non-zero coefficient, generate the non-zero value sub-blocks of the video block, and entropy code the non-zero value sub-blocks. In some cases, the computer readable medium may form part of a computer program product, which may be sold to manufactures and/or used in a video coding device. The computer program product may include a computer readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 4 is a table diagram illustrating coefficients of four different 4 by 4 sub-blocks of the 8 by 8 video block shown in FIG. 3.

FIG. 6 is a table diagram illustrating coefficients of four different 4 by 4 sub-blocks of the 8 by 8 video block shown in FIG. 3 for an exemplary syntax element value of four.

FIG. 7 is a table diagram illustrating coefficients of four different 4 by 4 sub-blocks of the 8 by 8 video block shown in FIG. 3 for an exemplary syntax element value of three.

FIG. 8 is a table diagram illustrating coefficients of four different 4 by 4 sub-blocks of the 8 by 8 video block shown in FIG. 3 for an exemplary syntax element value of two.

FIG. 9 is a table diagram illustrating coefficients of four different 4 by 4 sub-blocks of the 8 by 8 video block shown in FIG. 3 for an exemplary syntax element value of one.

DETAILED DESCRIPTION

Figure 1:
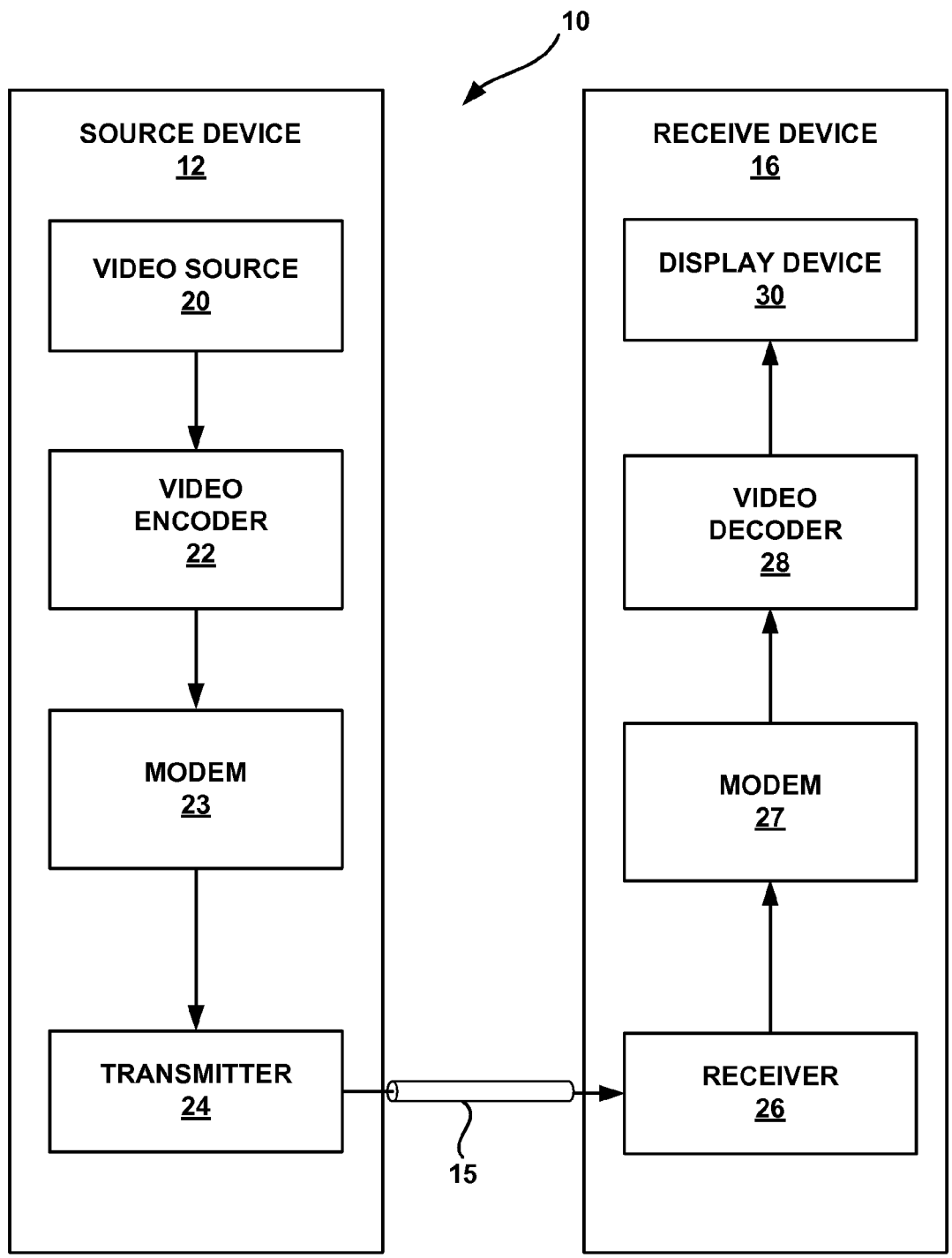
FIG. 1 is an exemplary block diagram illustrating a video encoding and decoding system.

This disclosure describes techniques for entropy coding of video blocks. The video blocks may form a video frame, video slice, or other video unit, and the techniques of this disclosure may be applied as part of a coding process (e.g., encoding or decoding) of a sequence of video units, such as frames or slices. In order to facilitate efficient entropy coding, this disclosure proposes a particular type of syntax element. The syntax element, according to this disclosure, may identify a number of non-zero value sub-blocks within a given video block, wherein the non-zero value sub-blocks comprise sub-blocks within the given video block that include at least one non-zero coefficient. In contrast, zero-value sub-blocks refer to sub-blocks within the given video block that include only zero valued coefficients.

According to this disclosure, zero-value sub-blocks may be skipped during entropy encoding, and the zero-value sub-blocks may be reconstructed at the decoder based on the syntax element. In this way, the coding of zero valued coefficients may be avoided to promote coding efficiency. The proposed syntax element provides a mechanism to convey the fact that one or more sub-blocks are zero-value sub-blocks that were skipped during the encoding process, thereby allowing a decoder to reconstruct such zero-value sub-blocks without any additional transfer of information. The syntax element may define the number of sub-blocks that are zero value sub-blocks, and in doing so, may inherently identify where such sub-blocks exist in the coded video block, and how the sub-blocks (the zero-value and non-zero value sub-blocks) are defined within a video block.

On the encoder side, a video block may be coded via spatial-based or motion-based prediction techniques, e.g., to produce intra-coded (I) frames or inter-coded (P or B) frames, respectively. The residual pixel values of the video block may be transformed and quantized prior to entropy coding. For entropy encoding, the coefficients of the video block (i.e., transformed and quantized coefficients) may be scanned in order to define a one-dimensional vector of coefficients. Zig-zag scanning is one example described herein, but other types of scanning, such as vertical or horizontal scanning, may also be used. The syntax element can be defined to identify a number of non-zero value sub-blocks that exist in the video block. A serialized, one-dimensional vector of coefficients corresponding to the video block may be interleaved based on the syntax element in order to define a set of one-dimensional vectors of coefficients corresponding to the non-zero value sub-blocks.

Entropy encoding (such as CAVLC, CABAC, or another entropy coding methodology) may be performed with respect to the one-dimensional vectors of coefficients corresponding to the non-zero value sub-blocks, while the zero-value sub-blocks can be ignored or skipped. Entropy coded non-zero value sub-blocks and the syntax element may define the encoded bitstream that can be sent to a decoder.

On the decoder side, the encoded bitstream is received. Again, the bitstream may include entropy coded non-zero value sub-blocks and the syntax element. Based on the syntax element that defines the number of non-zero value sub-blocks, the decoder can identify which sub-blocks are nonzero value sub-blocks that were entropy encoded and which sub-blocks are zero-value sub-blocks that were skipped. That is to say, the syntax element may define both the number of non-zero value sub-blocks and a number of zero-value sub-blocks that have all coefficients equal to zero. For example, given a known number of expected sub-blocks for a particular video block size, a syntax element that conveys the number of non-zero value sub-blocks or the number of zero-value sub-blocks may define both the number of non-zero value sub-blocks and a number of zero-value sub-blocks. Thus, based on the syntax element, the decoder decodes the non-zero value sub-blocks, and generates zeros for the coefficients of any zero-value sub-blocks in order to reconstruct the full set of coefficients for the video block. Inverse quantization, inverse transform, and spatial-based decoding or motion-based prediction can then be performed in order to reconstruct the video block.

FIG. 1 is a block diagram illustrating an exemplary video encoding and decoding system 10 that may implement techniques of this disclosure. As shown in FIG. 1, system 10 includes a source device 12 that transmits encoded video to a receive device 16 via a communication channel 15. Source device 12 and receive device 16 may comprise any of a wide range of devices. In some cases, source device 12 and receive device 16 comprise wireless communication device handsets, i.e., so-called cellular or satellite radiotelephones. The techniques of this disclosure, however, which generally concern entropy coding of video blocks, are not necessarily limited to wireless applications or settings.

Source device 12 may include a video source 20, video encoder 22 a modulator/demodulator (modem) 23 and a transmitter 24. Receive device 16 may include a receiver 26 a modem 27, a video decoder 28, and a display device 30. In accordance with this disclosure, video encoder 22 of source device 12 may be configured to perform efficient entropy coding as described in greater detail below.

The illustrated system 10 of FIG. 1 is merely exemplary. The entropy coding techniques of this disclosure may be performed by any encoding or decoding device that supports any of a wide variety of entropy coding methodologies, such as content adaptive variable length coding (CAVLC), context adaptive binary arithmetic coding (CABAC), or other entropy coding methodologies. Source device 12 and receive device 16 are merely examples such coding devices.

The techniques of this disclosure may include coding a syntax element that defines a number of non-zero value sub-blocks of a video block, wherein the non-zero value sub-blocks include at least one non-zero coefficient, generating the non-zero value sub-blocks of the video block based on the syntax element, and entropy coding the non-zero value sub-blocks. The techniques may be performed by device 12 during an encoding process and/or by device 16 during a decoding process.

In general, source device 12 generates coded video data for transmission to receive device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and receive device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard or technique, and transmitted to receive device 16 via transmitter 24.

Receiver 26 of receive device 16 receives information over channel 15, and modem 27 demodulates the information. The video decoding process performed by video decoder 28 may perform entropy decoding as part of the reconstruction of the video sequence. The entropy decoding process, like the encoding process, uses the techniques of this disclosure in order to support improved levels of data compression. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to receive device 16.

Video encoder 22 and video decoder 28 may operate according to a video compression standard that supports CAVAC, CABAC or another entropy coding methodology, such as the ITU-T H.264 standard, alternatively referred to as MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/ decoder (CODEC) in a respective mobile device, subscriber device, broadcast device, server, or the like.

A video sequence includes a series of video frames. In some cases, a video sequence can be arranged as a group of pictures (GOP). Video encoder 22 operates on video blocks within individual video frames in order to encode the video data. The video blocks may have fixed or varying sizes, and may differ in size according to a specified coding standard. Each video frame may include a series of slices. Each slice may include a series of macroblocks, which may be arranged into even smaller blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transform coefficients, e.g., following a transformation process such as discrete cosine transform or a conceptually similar transformation process. The transform coefficients may be quantized. The entropy coding techniques of this disclosure typically apply to entropy coding of quantized transform coefficients.

Video blocks, such as macroblocks, may be divided into smaller sized video blocks. Smaller video blocks can provide better resolution, and may be used for locations of a video frame that include high levels of detail. In general, macroblocks (MBs) and the various smaller blocks may all be considered to be video blocks. In addition, a slice may be considered to be a series of video blocks, such as MBs and/or smaller sized blocks. Each slice may be an independently decodable unit of a video frame. After prediction, a transform may be performed on the 8×8 residual block or 4×4 residual block, and an additional transform may be applied to the DC coefficients of the 4×4 blocks for chroma components or luma component if an intra_16×16 prediction mode is used. Following the transformation, the data may still be referred to as video blocks. However, following transformation, the video blocks contain transform coefficients, rather than pixel values. Hence, the transformed video blocks comprise blocks of transform coefficients. The term "coefficients" generally refers to transform coefficients, but may alternatively refer to other types of coefficients or values.

Following intra- or inter-based predictive coding and transformation techniques (such as the 4×4 or 8×8 integer transform used in H.264/AVC or a discrete cosine transform DCT), quantization may be performed. Other transformation techniques such as wavelet-based compression may be used. Quantization generally refers to a process in which coefficients are quantized to possibly reduce the amount of data used to represent the coefficients. The quantization process may reduce the bit depth associated with some or all of the coefficients. For example, an 8-bit value may be rounded down to a 7-bit value during quantization.

Following quantization, entropy coding may be performed according to the techniques described herein. In particular, video blocks of transform coefficients, such as 8 by 8 video blocks or 16 by 16 video blocks, may be interleaved into sets of 4 by 4 sub-blocks. The interleaving can be defined in a manner that promotes creation of zero-value sub-blocks, which comprise sub-blocks for which every transform coefficient is zero. A syntax element defines this interleaving and thereby defines the sub-blocks within a video block. During entropy coding, the zero-value sub-blocks are skipped, as the decoder can use the syntax element to reconstruct the zero-value sub-blocks. That is, only non-zero value sub-blocks are coded in the entropy coding process, and zero-value sub-blocks are discarded and not included in the encoded bitstream. The non-zero value sub-blocks refer to sub-blocks that have at least one non-zero coefficient. The zero-value sub-blocks refer to sub-blocks in which all transform coefficients have a value of zero.

Figure 2:
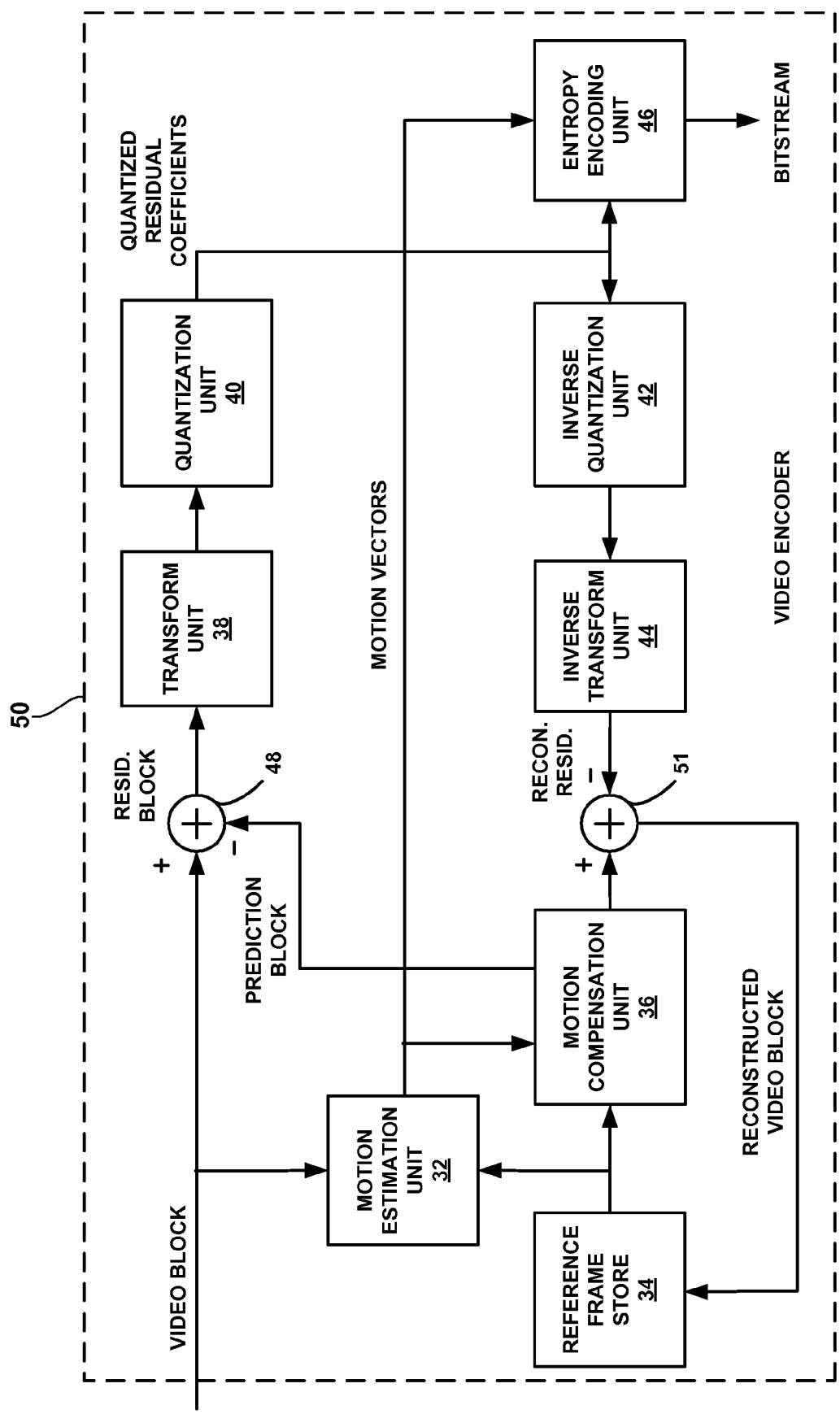
FIG. 2 is a block diagram illustrating an example of a video encoder consistent with this disclosure.

FIG. 2 is a block diagram illustrating an example of a video encoder 50 that includes an entropy encoding unit 46 that performs techniques of this disclosure during the encoding process. Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame to be encoded. In the example of FIG. 2, video encoder 50 includes motion estimation unit 32, reference frame store 34, motion compensation unit 36, block transform unit 38, quantization unit 40, inverse quantization unit 42, inverse transform unit 44 and entropy encoding unit 46. A deblocking filter (not shown) may also be included to filter block boundaries to remove blockiness artifacts. Video encoder 50 also includes summer 48 and summer 51. FIG. 2 illustrates the temporal prediction components of video encoder 50 for inter-coding of video blocks. Although not shown in FIG. 2 for ease of illustration, video encoder 50 also may include spatial prediction components for intra-coding of some video blocks.

Motion estimation unit 32 compares the video block to be encoded to various blocks in one or more adjacent video reference frames in order to determine one or more motion vectors. The adjacent frame or frames may be retrieved from reference frame store 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 32 identifies a block in an adjacent frame that most closely matches the current video block to be coded, and determines a displacement between the blocks. On this basis, motion estimation unit 32 produces a motion vector (MV) (or multiple MV's in the case of bidirectional prediction) that indicates the magnitude and trajectory of the displacement between the current video block and a predictive block used to code the current video block.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 36. Motion estimation unit 32 identifies the desired motion vector for a video block, and using the resulting motion vector, motion compensation unit 36 forms a prediction video block by motion compensation.

Video encoder 50 forms a residual video block by subtracting the prediction video block produced by motion compensation unit 36 from the original video block being coded. Summer 48 performs this subtraction operation. Block transform unit 38 applies a transform, such as a discrete cosine transform (DCT) or a conceptually similar transform, to the residual block, producing a video block comprising residual transform block coefficients. Block transform unit 38, for example, may perform other transforms defined by the H.264 standard, which are conceptually similar to DCT.

Quantization unit 40 quantizes the residual transform coefficients to further reduce bit rate. Quantization unit 40, for example, may limit the number of bits used to code each of the coefficients. After quantization, entropy encoding unit 46 entropy encodes the quantized transform coefficients according to an entropy coding methodology, such as CAVLC or CABAC, to further compress the data.

In particular, according to this disclosure, entropy encoding unit 46 may divide video blocks (such as an 8 by 8 or 16 by 16 video block) into sub-blocks (such as 4 by 4 sub-blocks). For example, the video block may comprise an 8 by 8 video block comprising 64 coefficients, and the sub-blocks may comprise 4 by 4 blocks, each comprising 16 coefficients. In another example, the video block may comprise a 16 by 16 video block comprising 256 coefficients, and the sub-blocks may comprise 4 by 4 blocks comprising 16 coefficients. Many other shapes or sizes of the blocks and sub-blocks, however, are consistent with this disclosure. In any case, the sub-blocks may be characterized as being either non-zero value sub-blocks or zero-value sub-blocks. The non-zero value sub-blocks comprise sub-blocks that have at least one non-zero coefficient (e.g., with at least one coefficient value of 1, 2, 3, or higher), while the zero-value sub-blocks comprise sub-blocks that have all zero valued coefficients.

Entropy encoding unit 46 codes a syntax element that defines a number of non-zero value sub-blocks of the video block, wherein the non-zero value sub-blocks include at least one non-zero coefficient. Entropy coding unit 46 generates the non-zero value sub-blocks, and entropy codes the non-zero value sub-blocks. For example, entropy encoding unit 46 may interleave the coefficients of the video block based on the syntax element in order to generate the sub-blocks, and this interleaving may promote the creation of zero-value sub-blocks. Entropy encoding unit 46 entropy codes the non-zero value sub-blocks, but skips entropy encoding of the zero-value sub-blocks, as the zero-value sub-blocks can be reconstructed at the decoder based on the syntax element without needing to transmit the zero values.

Following the entropy coding by entropy encoding unit 46, the encoded video may be transmitted to another device or archived for later transmission or retrieval. Inverse quantization unit 42 and inverse transform unit 44 apply inverse quantization and inverse transformation, respectively, to reconstruct the residual block in the pixel domain for use as a reference block. The zero-value sub-blocks are used in this reconstruction. Summer 51 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 as a reference block to encode a block in a subsequent video frame.

Figure 3:
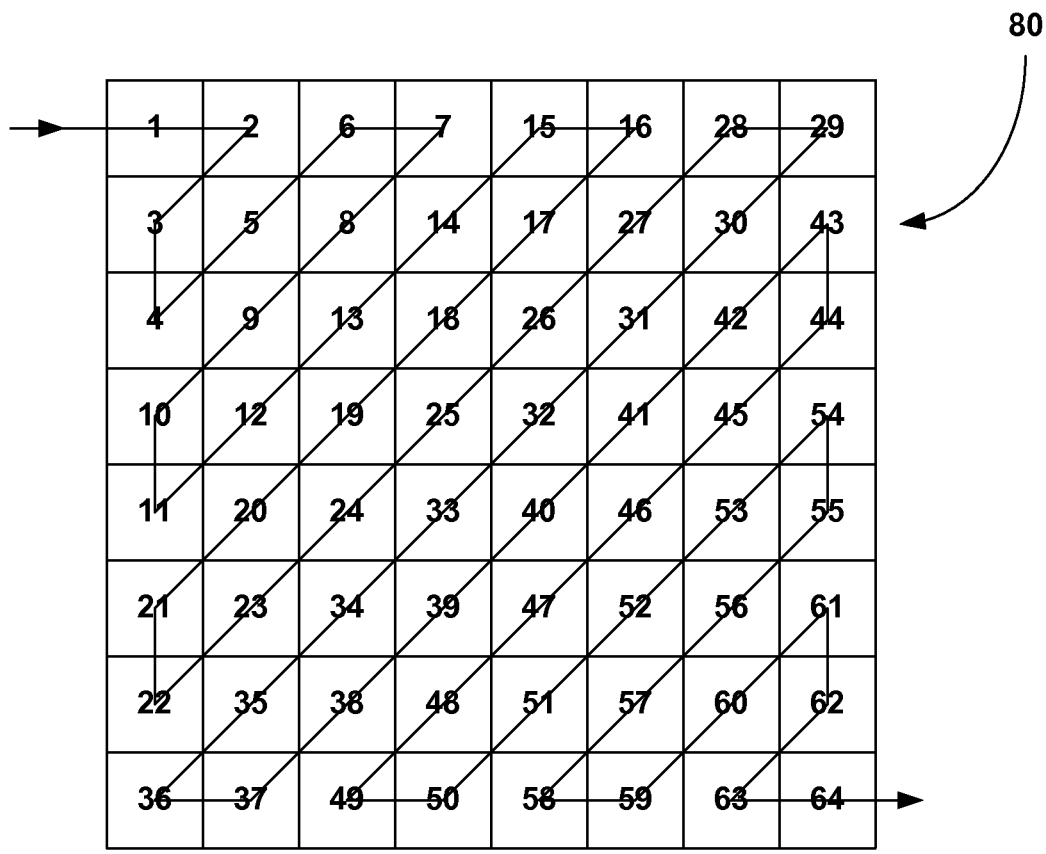
FIG. 3 is a conceptual diagram illustrating zig-zag scanning of an 8 by 8 video block.

FIG. 3 is a conceptual illustration of zig-zag scanning that may be performed by entropy encoding unit 46 (or by another unit of encoder 50) in order to represent video block 80 as a one-dimensional vector of coefficients. The scanning order for such zig-zag scanning follows the arrow through video block 80, and the coefficients are labeled in the scanning order. In particular, the numerical values shown in FIG. 3 indicate positions of the coefficients within a sequential one-dimensional vector, and do not represent values of the coefficients. The techniques of this disclosure are not limited to any particular scanning order or technique. However, zig-zag scanning, such as illustrated by FIG. 3, can be very useful for transform coefficients since higher energy coefficients are typically located in the upper-left hand corner of video block 80. Thus, zig-zag scanning often results in many lower-numbered coefficients having zero-values. Although described as being performed by entropy encoding unit 46, the zig-zag scanning, or other type of scanning (such as horizontal or vertical scanning) into a one-dimensional vector, may be performed at an earlier stage in the encoding process.

FIG. 4 is a table diagram illustrating coefficients of four different 4 by 4 sub-blocks of the 8 by 8 video block shown in FIG. 3. As shown in FIG. 4, four different interleaved sub-blocks can be defined and represented as four different one-dimensional vectors. Every fourth coefficient is included in a given sub-block. Thus, video block 80 of FIG. 3 can be represented as a one-dimensional vector of sixty four coefficients:

(1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64).

The four different interleaved sub-blocks can be represented as four different one-dimensional vectors of sixteen coefficients, as shown in FIG. 4. In this case, interleaved sub-block 1 is:

(1, 5, 9, 13, 17, 21, 25, 29, 33, 37, 41, 45, 49, 53, 57, 61).

Interleaved sub-block 2 is:

(2, 6, 10, 14, 18, 22, 26, 30, 34, 38, 42, 46, 50, 54, 58, 62).

Interleaved sub-block 3 is:

(3, 7, 11, 15, 19, 23, 27, 31, 35, 39, 43, 47, 51, 55, 59, 63).

Interleaved sub-block 4 is:

(4, 8, 12, 16, 20, 24, 28, 32, 36, 40, 44, 48, 52, 57, 60, 64).

Hence, the values of the video blocks are interleaved such that every fourth transform coefficient is combined in a given sub-block, with each sub-block offset by one from the next sub-block. In the sub-blocks shown above and in FIG. 4, the numbers refer to the positions of the coefficients within the video block that is divided into sub-blocks. In accordance with this disclosure, it can be useful to interleave a video block in a manner that promotes the creation of one or more zero-value video blocks. In this case, a syntax element that identifies one or more zero-value video blocks may comprise significantly fewer bits than would otherwise be needed to encode and convey the zero-value video blocks. As discussed in greater detail below, a syntax element referred to herein as Syntax(Number of Blocks) can be used for this purpose.

Figure 5:
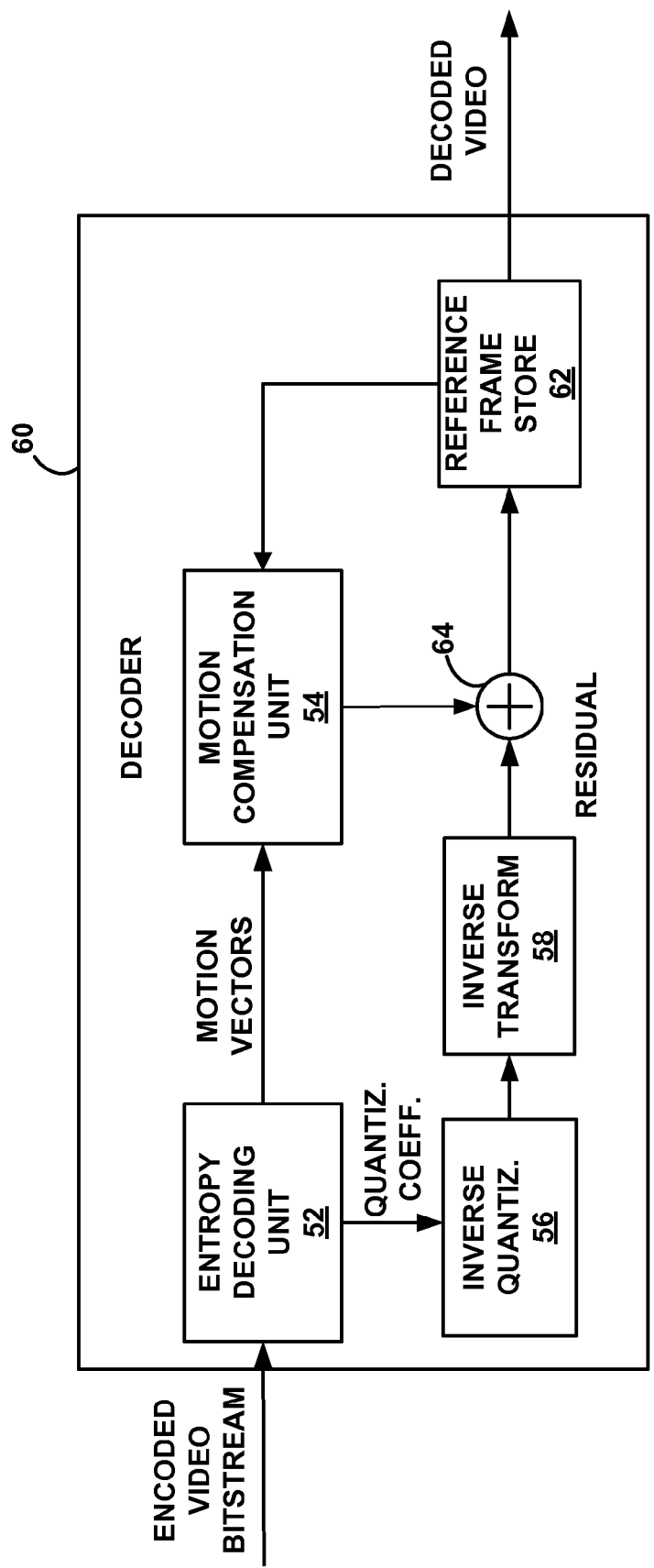
FIG. 5 is a block diagram illustrating an example of a video decoder consistent with this disclosure.

FIG. 5 is a block diagram illustrating an example of a video decoder 60, which decodes a video sequence that is encoded in the manner described herein. Video decoder 60 includes an entropy decoding unit 52 that performs the reciprocal decoding function of the encoding performed by entropy encoding unit 46 of FIG. 2.

Video decoder 60 may perform intra- and inter-decoding of blocks within video frames. In the example of FIG. 5, video decoder 60 includes entropy decoding unit 52 (mentioned above), motion compensation unit 54, inverse quantization unit 56, inverse transform unit 58, and reference frame store 62. Video decoder 60 also includes summer 64. Optionally, video decoder 60 also may include a deblocking filter (not shown) that filters the output of summer 64. FIG. 5 illustrates the temporal prediction components of video decoder 60 for inter-decoding of video blocks. Although not shown in FIG. 5, video decoder 60 may also include spatial prediction components for intra-decoding of some video blocks.

As noted, entropy decoding unit 52 that performs the reciprocal decoding function of the encoding performed by entropy encoding unit 46 of FIG. 2. In general, entropy decoding unit 52 codes a syntax element that defines a number of non-zero value sub-blocks of the video block, wherein the non-zero value sub-blocks include at least one non-zero coefficient, generates the non-zero value sub-blocks of the video block based on the syntax element, and entropy codes the non-zero value sub-blocks.

On the decoding side, generating the non-zero value sub-blocks comprises parsing the bitstream based on the syntax element. Entropy decoding unit 52 receives a bitstream that comprises the syntax element and entropy coded non-zero value sub-blocks, but does not include any zero-value sub-blocks that have all coefficients equal to zero. Entropy decoding unit 52 can identify such zero-value sub-blocks based on the syntax element. Entropy decoding unit 52 parses the bitstream based on the syntax element in order to generate the non-zero value sub-blocks, and then reconstructs the sets of zero valued coefficients of any zero-value sub-blocks. In other words, the coefficients of zero-value sub-blocks are excluded from the encoded bitstream, and entropy decoding unit 52 generates such values. Entropy decoding unit 52 simply uses the syntax element to determine whether any zero-value sub-blocks have been excluded, and therefore, need to be generated at decoder 60.

The interleaving process, e.g., performed by entropy encoder 46 of encoder 50 (FIG. 2) may define the non-zero value sub-blocks and the zero value sub-blocks. Moreover, entropy encoder 46 may select the type of interleaving to perform in order to generate zero value sub-blocks, if possible. In the examples that follow, it is assumed that the video block comprises an 8 by 8 block of coefficients, and that the sub-blocks comprise 4 by 4 blocks. This disclosure, however, is not limited to any particular sizes or shapes of blocks. Sub-blocks are generally a sub-set of the coefficients associated with a video block being coded, but the actual number of coefficients in the video block and number of coefficients in the sub-blocks are subject to a wide variety of variations or implementations.

The syntax element may be represented as Syntax(Number of Blocks). In the example of an 8 by 8 video block that can be interleaved into four 4 by 4 sub-blocks, Syntax(Number of Blocks) may assume a value of 1, 2, 3 or 4. As another example, a 16 by 16 video block that can be interleaved into sixteen 4 by 4 sub-blocks, and in this case, Syntax(Number of Blocks) may assume a value of 1, 2, 3, 4, 5, 6, 7, 8, 9, 10, 11, 12, 13, 14, 15 or 16. Again, many other shapes and sizes of video blocks and sub-blocks are consistent with this disclosure. In some cases, the value of Syntax(Number of Blocks) may be limited, e.g., to values of 1 or 3 for an 8 by 8 video block that is interleaved into four 4 by 4 sub-blocks.

FIG. 6 is a table diagram illustrating coefficients of four different 4 by 4 sub-blocks of the 8 by 8 video block shown in FIG. 3 for an exemplary syntax element value of four. That is, Syntax(Number of Blocks)=4 in FIG. 6. In this case, the interleaving is the same as that shown in FIG. 4, and discussed above. Every fourth coefficient is included in a given sub-block. Video block 80 of FIG. 3 can be represented as a one-dimensional vector of sixty four coefficients:

(1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64).

The four different interleaved sub-blocks can be represented as four different one-dimensional vectors of sixteen coefficients, as shown in FIG. 6. In this case, when Syntax(Number of Blocks)=4, interleaved sub-block 1 is:

(1, 5, 9, 13, 17, 21, 25, 29, 33, 37, 41, 45, 49, 53, 57, 61).

Interleaved sub-block 2 is:

(2, 6, 10, 14, 18, 22, 26, 30, 34, 38, 42, 46, 50, 54, 58, 62).

Interleaved sub-block 3 is:

(3, 7, 11, 15, 19, 23, 27, 31, 35, 39, 43, 47, 51, 55, 59, 63).

Interleaved sub-block 4 is:

(4, 8, 12, 16, 20, 24, 28, 32, 36, 40, 44, 48, 52, 57, 60, 64).

The illustration of FIG. 6, with Syntax(Number of Blocks)=4 may signal to the decoder 60 that all of the sub-blocks are non-zero value sub-blocks, and that none of the sub-blocks comprise zero-value sub-blocks.

In some cases, however, some of the lower numbered coefficients (see FIG. 3) may have values equal to zero. If the interleaving shown in FIG. 4 or 6 is used, each of the sub-blocks will include at least some of the higher numbered coefficients, which may have non-zero values. In this case, a different type of interleaving may be desirable in order to help generate zero-value sub-blocks. If, for example, all of coefficients 49 through 64 have zero values, which is quite typical, it may be desirable to include all of coefficients 49 through 64 in a sub-block, instead of interleaving them with other coefficients in multiple sub-blocks.

FIG. 7 is a table diagram illustrating coefficients of four different 4 by 4 sub-blocks of the 8 by 8 video block shown in FIG. 3 for an exemplary syntax element value of three. That is, Syntax(Number of Blocks)=3 in FIG. 7. In this case, every third coefficient is included in a given sub-block, and the fourth sub-block comprises coefficients 49-64 to form a zero-value sub-block. The encoder can perform this interleaving and use a syntax element equal to three, in order to convey this fact to the decoder.

In this case, if block 80 of FIG. 3 is represented as a one-dimensional vector of sixty four coefficients:

(1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64), the four different interleaved sub-blocks can be represented as four different one-dimensional vectors of sixteen coefficients, as shown in FIG. 7. In this case, interleaved sub-block 1 is:

(1, 4, 7, 10, 13, 16, 19, 22, 25, 28, 31, 34, 37, 40, 43, 46).

Interleaved sub-block 2 is:

(2, 5, 8, 11, 14, 17, 20, 23, 26, 29, 32, 35, 38, 41, 44, 47).

Interleaved sub-block 3 is:

(3, 6, 9, 12, 15, 18, 21, 24, 27, 30, 33, 36, 39, 42, 45, 4).

Sub-block 4 is:

(49, 50, 51, 52, 53, 54, 55, 56, 57, 58, 59, 60, 61, 62, 63, 64).

Sub-block 4 is not encoded into the bitstream since all of the values of coefficients 49 through 64 have values of zero. Thus, sub-block 4 is a zero-value sub-block, which is identifiable to the decoder via the syntax element. Basically, if Syntax (Number of Blocks)=3, decoder 60 may presume that coefficients 49 through 64 have values of zero, and that sub-blocks 1, 2 and 3 were interleaved as shown in FIG. 7. Consequently, bits that would otherwise be needed to convey information for coefficients 49 through 64 can be eliminated from the bitstream to promote coding efficiency.

FIG. 8 is a table diagram illustrating coefficients of four different 4 by 4 sub-blocks of the 8 by 8 video block shown in FIG. 3 for an exemplary syntax element value of two. That is, Syntax(Number of Blocks)=2 in FIG. 8. In this case, every other coefficient, i.e., every second coefficient, is included in a given sub-block, and the third and fourth sub-blocks comprise coefficients 33-48 and 49-64, respectively, to form two zero-value sub-blocks.

In this case, if block 80 of FIG. 3 is represented as a one-dimensional vector of sixty four coefficients:

(1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64), the four different interleaved sub-blocks can be represented as four different one-dimensional vectors of sixteen coefficients, as shown in FIG. 8. In this case, interleaved sub-block 1 is:

(1, 3, 5, 7, 9, 11, 13, 15, 17, 19, 21, 23, 25, 27, 29, 31).

Interleaved sub-block 2 is:

(2, 4, 6, 8, 10, 12, 14, 16, 18, 20, 22, 24, 26, 28, 30, 32).

Sub-block 3 is:

(33, 34, 35, 36, 37, 38, 39, 40, 41, 42, 43, 44, 45, 46, 47, 48).

Sub-block 4 is:

(49, 50, 51, 52, 53, 54, 55, 56, 57, 58, 59, 60, 61, 62, 63, 64).

Sub-blocks 3 and 4 are not encoded into the bitstream since all of the values of coefficients 33 through 64 have values of zero. Thus, sub-blocks 3 and 4 comprise zero-value sub-blocks, which can be identified by the syntax element. Basically, if Syntax(Number of Blocks)=2, decoder 60 may presume that coefficients 33 through 64 have values of zero, and that sub-blocks 1 and 2 were interleaved as shown in FIG. 8. Consequently, in this case, bits that would otherwise be needed to convey information for coefficients 33 through 64 can be eliminated from the bitstream to promote coding efficiency.

FIG. 9 is a table diagram illustrating coefficients of four different 4 by 4 sub-blocks of the 8 by 8 video block shown in FIG. 3 for an exemplary syntax element value of one.

That is, Syntax(Number of Blocks)=1 in FIG. 9. In this case, sub-blocks are defined in the scanning order, and the second, third and fourth sub-blocks comprise zero-value sub-blocks.

In this case, if block 80 of FIG. 3 is represented as a one-dimensional vector of sixty four coefficients:

(1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64), the four different interleaved sub-blocks can be represented as four different one-dimensional vectors of sixteen coefficients, as shown in FIG. 9. In this case, sub-block 1 is:

(1, 2, 3, 4, 5, 6, 7, 8, 9, 10, 11, 12, 13, 14, 15, 16).

Sub-block 2 is:

(17, 18, 19, 20, 21, 22, 23, 24, 25, 26, 27, 28, 29, 30, 31, 32).

Sub-block 3 is:

(33, 34, 35, 36, 37, 38, 39, 40, 41, 42, 43, 44, 45, 46, 47, 48).

Sub-block 4 is:

(49, 50, 51, 52, 53, 54, 55, 56, 57, 58, 59, 60, 61, 62, 63, 64).

Sub-blocks 2, 3 and 4 are not encoded into the bitstream since all of the values of coefficients 17 through 64 have values of zero. Thus, sub-blocks 2, 3 and 4 comprise zero-value sub-blocks, which can be identified by the syntax element. Basically, if Syntax(Number of Blocks)=1, decoder 60 may presume that coefficients 17 through 64 have values of zero, and that sub-blocks 1 was defined as coefficients 1-16, as shown in FIG. 9.

An encoded bitstream, consistent with this disclosure, includes entropy coded bits associated with non-zero value sub-blocks, and also includes the described syntax element, which allows a decoder to properly parse the bitstream and generate the zero values associated with any zero-value sub-blocks excluded from the bitstream. The syntax element may be conveyed as syntax information associated with an encoded bitstream, and may be conveyed within any portion of a bitstream that is specifically defined to convey such syntax information associated with the encoded bitstream. In some cases, the syntax element may be conveyed as part of a header file, or a network abstraction layer (NAL) unit. In any case, the decoder may be programmed to understand the syntax information and use the syntax information in the decoding process.

Figure 10:
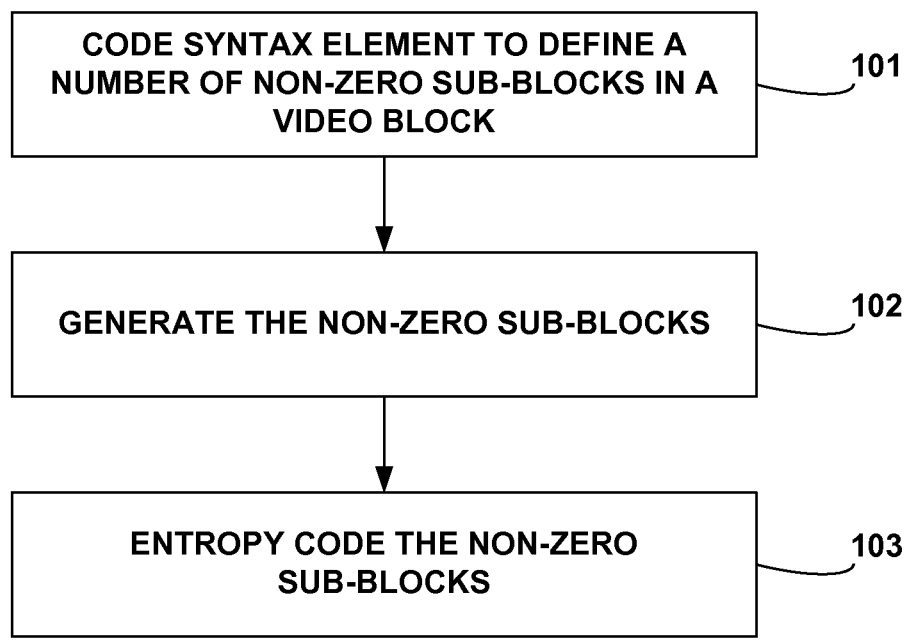
FIG. 10 is a flow diagram illustrating a coding (i.e., encoding or decoding) technique consistent with this disclosure.

FIG. 10 is a flow diagram illustrating a coding (i.e., encoding or decoding) technique consistent with this disclosure. As shown in FIG. 10, an entropy coding unit (e.g., entropy encoding unit 46 of FIG. 2 or entropy decoding unit 52 of FIG. 5) codes a syntax element to define a number of non-zero value sub-blocks in a video block (101). The non-zero value sub-block may comprise sets of coefficients that include at least one non-zero coefficient. In contrast, zero-value sub-blocks may comprise sets of coefficients that include all coefficients that have values of zero. The entropy coding unit (e.g., entropy encoding unit 46 of FIG. 2 or entropy decoding unit 52 of FIG. 5) generates the non-zero value sub-blocks (102), and entropy codes the non-zero value sub-blocks (103).

Figure 11:
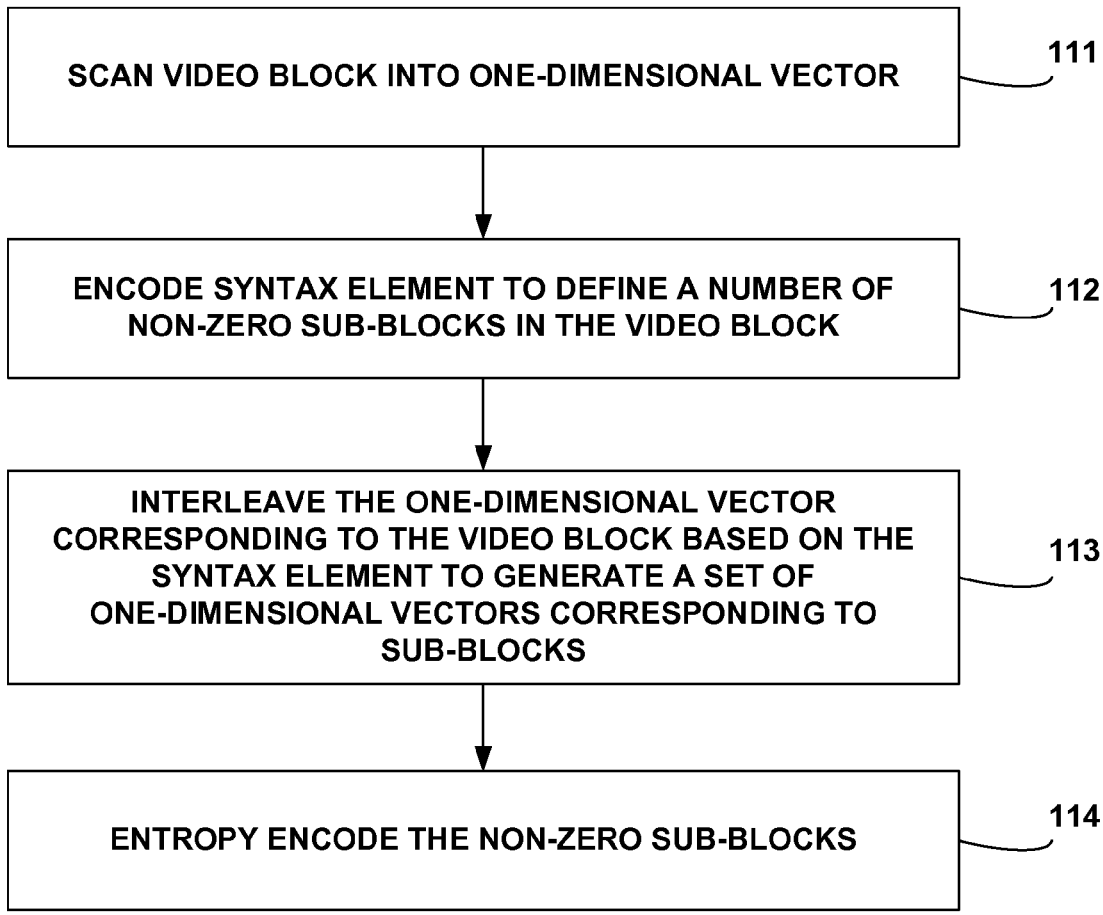
FIG. 11 is a flow diagram illustrating an encoding technique consistent with this disclosure.

FIG. 11 is a flow diagram illustrating an encoding technique consistent with this disclosure. As shown in FIG. 11, entropy encoding unit 46 scans a video block into a one-dimensional vector (111). This scanning may comprise a zig-zag scan, as shown in FIG. 3, or another type of scanning technique such as a horizontal scan, a vertical scan, a reverse zig-zag scan, or the like. Entropy encoding unit 46 encodes a syntax element in order to define a number of non-zero value sub-blocks in the video block (112), and interleaves the one-dimensional vector corresponding to the video block to generate a set of one-dimensional vectors corresponding to sub-blocks (113). FIGS. 6-9 illustrate examples of steps 112 and 113 for an 8 by 8 block interleaved into four 4 by 4 sub-blocks, where the type of interleaving depends on the syntax element. As described herein, entropy encoding unit 46 entropy encodes the non-zero value sub-blocks (114), and may skip encoding of the zero-value sub-blocks because the zero-value sub-blocks can be reconstructed at the decoder based on the syntax element.

Figure 12:
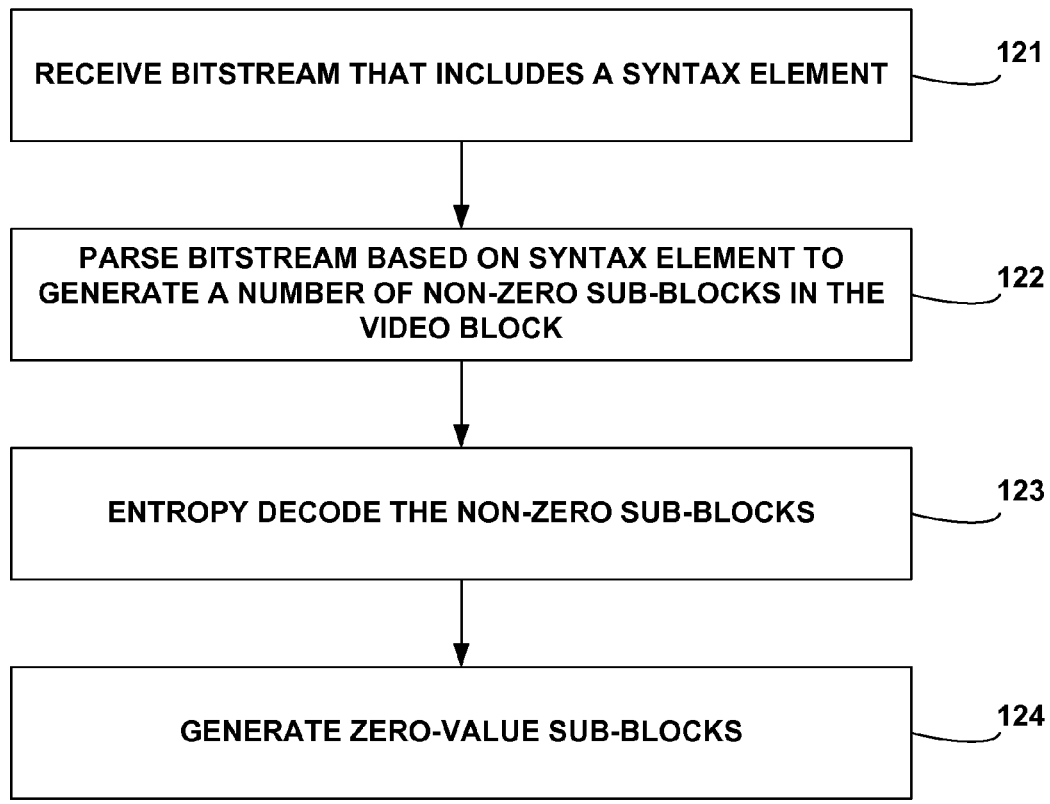
FIG. 12 is a flow diagram illustrating a decoding technique consistent with this disclosure.

FIG. 12 is a flow diagram illustrating a decoding technique consistent with this disclosure. As shown in FIG. 12, entropy decoding unit 52 receives a bitstream that includes a syntax element (121). Entropy decoding unit 52 parses the bitstream based on the syntax element to generate a number of non-zero value sub-blocks in the video block (122). For example, the syntax element may inform entropy decoding unit 52 of the type of interleaving that was used by the encoder. FIGS. 6-9 and the corresponding description above, sets forth examples of syntax element values of 1, 2, 3 and 4 that may be defined for 8 by 8 coefficient video blocks. Entropy decoding unit 52 can use the syntax element to determine how to parse the bitstream in order to properly generate the non-zero value sub-blocks. Once the non-zero value sub-blocks are generated, entropy decoding unit 52 entropy decodes the non-zero value sub-blocks (123), and generates zero valued coefficients for any zero-value sub-blocks that were not included in the bitstream (124). Again, the syntax element informs entropy decoding unit 52 of any such zero-value sub-blocks that were not included in the bitstream.

Referring again to FIG. 1, in one specific example consistent with this disclosure, encoder 22 may apply 4 by 4 CAVLC coding, as set forth in ITU H.264, but may only apply such 4 by 4 CAVLC coding to non-zero value sub-blocks of a larger scanned video block. The described syntax element informs the decoder of the zero-value sub-blocks. In this case, encoder 22 applies CAVLC techniques to encode a 4 by 4 non-zero value sub-block of coefficients as follows. First, encoder 22 codes the total number of nonzero coefficients in the 4 by 4 non-zero value sub-block in combination with the number of "trailing ones." The number of trailing ones can be defined as the number of coefficients with a magnitude of one that are encountered before a coefficient with magnitude greater than one is encountered when the coefficient vector is read in a reverse scanning order. The variable length code used to code this information is based upon a predicted number of nonzero coefficients, where the prediction is based on the number of nonzero coefficients in previously encoded neighboring blocks (e.g., upper and left neighboring blocks).

Second, encoder 22 codes the sign of any trailing ones. Third, encoder 22 codes the levels (i.e., magnitudes) of non-zero coefficients other than the trailing ones. Fourth, encoder 22 codes the number of zero values in the coefficient vector before the last nonzero coefficient, i.e. the sum of all the "runs." The variable length code used when coding this summation value may depend upon the total number of nonzero coefficients in the block, since there is typically some relationship between these two values. Finally, encoder 22 codes the run that occurs before each nonzero coefficient, starting from the last nonzero value in the coefficient vector.

The variable length coding table used to encode a run value may be selected based upon the sum of the runs. If, for example, a block has a "sum of runs" of 8, and the first run encoded was 6, then all remaining runs must be 0, 1, or 2. Because the possible run length becomes progressively shorter, more efficient variable length codes can be selected to minimize the number of bits required to represent a particular run value.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of encoding a video block, the method comprising:
    scanning the video block to define a one-dimensional vector of coefficients;
    dividing the one-dimensional vector of coefficients to define a set of one-dimensional vectors of sub-blocks of the video block;
    coding a syntax element that defines a number of non-zero value sub-blocks of the video block, wherein the non-zero value sub-blocks include at least one non-zero coefficient;
    interleaving coefficients of the non-zero value sub-blocks to define interleaved sub-blocks;
    entropy coding the interleaved sub-blocks; and
    skipping entropy coding of zero-value sub-blocks, wherein zero-value sub-blocks comprise sub-blocks of the video block that have all coefficients equal to zero.

2. The method of claim 1, wherein the syntax element defines both the number of non-zero value sub-blocks and a number of zero-value sub-blocks that have all coefficients equal to zero.

3. The method of claim 1, wherein the video block comprises one of an 8 by 8 video block comprising 64 coefficients and a 16 by 16 video block comprising 256 coefficients, and wherein the sub-blocks comprise 4 by 4 blocks comprising 16 coefficients.

4. The method of claim 1, wherein entropy coding the interleaved sub-blocks comprises performing at least one of content adaptive variable length coding (CAVLC) or context adaptive binary arithmetic coding (CABAC) on coefficients of the non-zero value sub-blocks.

5. An apparatus comprising an encoder configured to:
    scan a video block to define a one-dimensional vector of coefficients;
    divide the one-dimensional vector of coefficients to define a set of one-dimensional vectors of sub-blocks of the video block;
    code a syntax element that defines a number of non-zero value sub-blocks of a video block, wherein the non-zero value sub-blocks include at least one non-zero coefficient;
    interleave coefficients of the non-zero value sub-blocks to define interleaved sub-blocks;
    entropy code the interleaved sub-blocks; and
    skip entropy coding of zero-value sub-blocks, wherein zero-value sub-blocks comprise sub-blocks of the video block that have all coefficients equal to zero.

6. The apparatus of claim 5, wherein the syntax element defines both the number of non-zero value sub-blocks and a number of zero-value sub-blocks that have all coefficients equal to zero.

7. The apparatus of claim 5, wherein the video block comprises one of an 8 by 8 video block comprising 64 coefficients and a 16 by 16 video block comprising 256 coefficients, and wherein the sub-blocks comprise 4 by 4 blocks comprising 16 coefficients.

8. The apparatus of claim 5, wherein the encoder performs at least one of content adaptive variable length coding (CAVLC) or context adaptive binary arithmetic coding (CABAC) on coefficients of the interleaved sub-blocks.

9. The apparatus of claim 5, wherein the apparatus comprises one of an integrated circuit and a microprocessor.

10. A non-transitory computer-readable storage medium having stored thereon instructions that upon execution in a video encoding device cause the device to code a video block, wherein the stored instructions cause the device to:
   scan the video block to define a one-dimensional vector of coefficients;
   divide the one-dimensional vector of coefficients to define a set of one-dimensional vectors of sub-blocks of the video block;
   code a syntax element that defines a number of non-zero value sub-blocks of the video block, wherein the non-zero value sub-blocks include at least one non-zero coefficient;
   interleave coefficients of the non-zero value sub-blocks to define interleaved sub-blocks;
   entropy code the interleaved sub-blocks; and
   skip entropy coding of zero-value sub-blocks, wherein zero-value sub-blocks comprise sub-blocks of the video block that have all coefficients equal to zero.

11. The computer-readable storage medium of claim 10, wherein the syntax element defines both the number of non-zero value sub-blocks and a number of zero-value sub-blocks that have all coefficients equal to zero.

12. The computer-readable storage medium of claim 10, wherein the video block comprises one of an 8 by 8 video block comprising 64 coefficients and a 16 by 16 video block comprising 256 coefficients, and wherein the sub-blocks comprise 4 by 4 blocks comprising 16 coefficients.

13. The computer-readable storage medium of claim 10, wherein the instructions cause the device to:
   perform at least one of content adaptive variable length coding (CAVLC) or context adaptive binary arithmetic coding (CABAC) on coefficients of the interleaved sub-blocks.

14. A device comprising:
   means for scanning a video block to define a one-dimensional vector of coefficients;
   means for dividing the one-dimensional vector of coefficients to define a set of one-dimensional vectors of sub-blocks of the video block;
   means for coding a syntax element that defines a number of non-zero value sub-blocks of a video block, wherein the non-zero value sub-blocks include at least one non-zero coefficient;
   means for interleaving coefficients of the non-zero value sub-blocks to define interleaved sub-blocks;
   means for entropy coding the interleaved sub-blocks; and
   means for skipping entropy coding of zero-value sub-blocks, wherein zero-value sub-blocks comprise sub-blocks of the video block that have all coefficients equal to zero.

15. The device of claim 14, wherein the syntax element defines both the number of non-zero value sub-blocks and a number of zero-value sub-blocks that have all coefficients equal to zero.

16. The device of claim 14, wherein the video block comprises one of an 8 by 8 video block comprising 64 coefficients and a 16 by 16 video block comprising 256 coefficients, and wherein the sub-blocks comprise 4 by 4 blocks comprising 16 coefficients.

17. The device of claim 14, wherein the means for entropy coding the interleaved sub-blocks comprises means for performing at least one of content adaptive variable length coding (CAVLC) or context adaptive binary arithmetic coding (CABAC) on coefficients of the interleaved sub-blocks.

18. A device comprising:
   an encoder configured to:
      scan the video block to define a one-dimensional vector of coefficients;
      divide the one-dimensional vector of coefficients to define a set of one-dimensional vectors of sub-blocks of the video block;
      encode a syntax element that defines a number of non-zero value sub-blocks of a video block, wherein the non-zero value sub-blocks include at least one non-zero coefficient;
      interleave coefficients of the non-zero value sub-blocks to define interleaved sub-blocks;
      entropy encode the interleaved sub-blocks; and
      skip entropy encoding of zero-value sub-blocks, wherein zero-value sub-blocks comprise sub-blocks of the video block that have all coefficients equal to zero; and
   a wireless transmitter that sends a bitstream comprising the entropy encoded interleaved sub-blocks and the syntax element.

19. A device comprising:
   a wireless receiver that receives a bitstream comprising a set of interleaved and entropy coded sub-blocks and a syntax element that defines a number of non-zero value sub-blocks of the video block, wherein the non-zero value sub-blocks include at least one non-zero coefficient; and
   a decoder configured to:
      entropy decode the interleaved and entropy coded sub-blocks to define interleaved sub-blocks;
      skip entropy decoding of zero-value sub-blocks, wherein zero-value sub-blocks comprise sub-blocks of the video block that have all coefficients equal to zero;
      generate one or more zero-value sub-blocks based on the syntax element, wherein the received bitstream does not include the zero-value sub-blocks;
      generate a one-dimensional vector of coefficients based on the interleaved sub-blocks and the one or more zero value sub-blocks; and
      inverse scan the one-dimensional vector of coefficients to define a two-dimensional representation of the video block.

20. A method of decoding a video block, the method comprising:
   receiving a bitstream comprising a set of interleaved and entropy coded sub-blocks and a syntax element that defines a number of non-zero value sub-blocks of the video block, wherein the non-zero value sub-blocks include at least one non-zero coefficient;
   entropy decoding the interleaved and entropy coded sub-blocks to define interleaved sub-blocks;
   skipping entropy decoding of zero-value sub-blocks, wherein zero-value sub-blocks comprise sub-blocks of the video block that have all coefficients equal to zero;
   generating one or more zero-value sub-blocks based on the syntax element, wherein the received bitstream does not include the zero-value sub-blocks;
   generating a one-dimensional vector of coefficients based on the interleaved sub-blocks and the one or more zero-value sub-blocks; and inverse scanning the one-dimensional vector of coefficients to define a two-dimensional representation of the video block.

21. The method of claim 20, wherein the syntax element defines both the number of non-zero value sub-blocks and a number of zero-value sub-blocks that have all coefficients equal to zero.

22. The method of claim 20, wherein the video block comprises one of an 8 by 8 video block comprising 64 coefficients and a 16 by 16 video block comprising 256 coefficients, and wherein the sub-blocks comprise 4 by 4 blocks comprising 16 coefficients.

23. The method of claim 20, wherein entropy decoding the interleaved and entropy coded sub-blocks comprises performing at least one of content adaptive variable length coding (CAVLC) or context adaptive binary arithmetic coding (CABAC) on the interleaved and entropy coded sub-blocks.

24. An apparatus comprising a decoder configured to:
receive a bitstream comprising a set of interleaved and entropy coded sub-blocks and a syntax element that defines a number of non-zero value sub-blocks of a video block, wherein the non-zero value sub-blocks include at least one non-zero coefficient;
entropy decode the interleaved and entropy coded sub-blocks to define interleaved sub-blocks;
skip entropy decoding of zero-value sub-blocks, wherein zero-value sub-blocks comprise sub-blocks of the video block that have all coefficients equal to zero;
generate one or more zero-value sub-blocks based on the syntax element, wherein the received bitstream does not include the zero-value sub-blocks;
generate a one-dimensional vector of coefficients based on the interleaved sub-blocks and the one or more zero value sub-blocks; and
inverse scan the one-dimensional vector of coefficients to define a two-dimensional representation of the video block.

25. The apparatus of claim 24, wherein the syntax element defines both the number of non-zero value sub-blocks and a number of zero-value sub-blocks that have all coefficients equal to zero.

26. The apparatus of claim 24, wherein the video block comprises one of an 8 by 8 video block comprising 64 coefficients and a 16 by 16 video block comprising 256 coefficients, and wherein the sub-blocks comprise 4 by 4 blocks comprising 16 coefficients.

27. The apparatus of claim 24, wherein the decoder performs at least one of content adaptive variable length coding (CAVLC) or context adaptive binary arithmetic coding (CABAC) on the interleaved and entropy coded sub-blocks.

28. The apparatus of claim 24, wherein the apparatus comprises one of an integrated circuit and a microprocessor.

29. A non-transitory computer-readable storage medium having stored thereon instructions that upon execution in a video decoding device cause the device to decode a video block, wherein the instructions cause the device to:
receive a bitstream comprising a set of interleaved and entropy coded sub-blocks and a syntax element that defines a number of non-zero value sub-blocks of the video block, wherein the non-zero value sub-blocks include at least one non-zero coefficient;
entropy decode the interleaved and entropy coded sub-blocks to define interleaved sub-blocks;
skip entropy decoding of zero-value sub-blocks, wherein zero-value sub-blocks comprise sub-blocks of the video block that have all coefficients equal to zero;
generate one or more zero-value sub-blocks based on the syntax element, wherein the received bitstream does not include the zero-value sub-blocks;
generate a one-dimensional vector of coefficients based on the interleaved sub-blocks and the one or more zero value sub-blocks; and
inverse scan the one-dimensional vector of coefficients to define a two-dimensional representation of the video block.

30. A device comprising:
means for receiving a bitstream comprising a set of interleaved and entropy coded sub-blocks and a syntax element that defines a number of non-zero value sub-blocks of the video block, wherein the non-zero value sub-blocks include at least one non-zero coefficient;
means for entropy decoding the interleaved and entropy coded sub-blocks to define interleaved sub-blocks;
means for skipping entropy decoding of zero-value sub-blocks, wherein zero-value sub-blocks comprise sub-blocks of the video block that have all coefficients equal to zero;
means for generating one or more zero-value sub-blocks based on the syntax element, wherein the received bitstream does not include the zero-value sub-blocks;
means for generating a one-dimensional vector of coefficients based on the interleaved sub-blocks and the one or more zero-value sub-blocks; and
means for inverse scanning the one-dimensional vector of coefficients to define a two-dimensional representation of the video block.

* * * * *